Patented Oct. 6, 1931

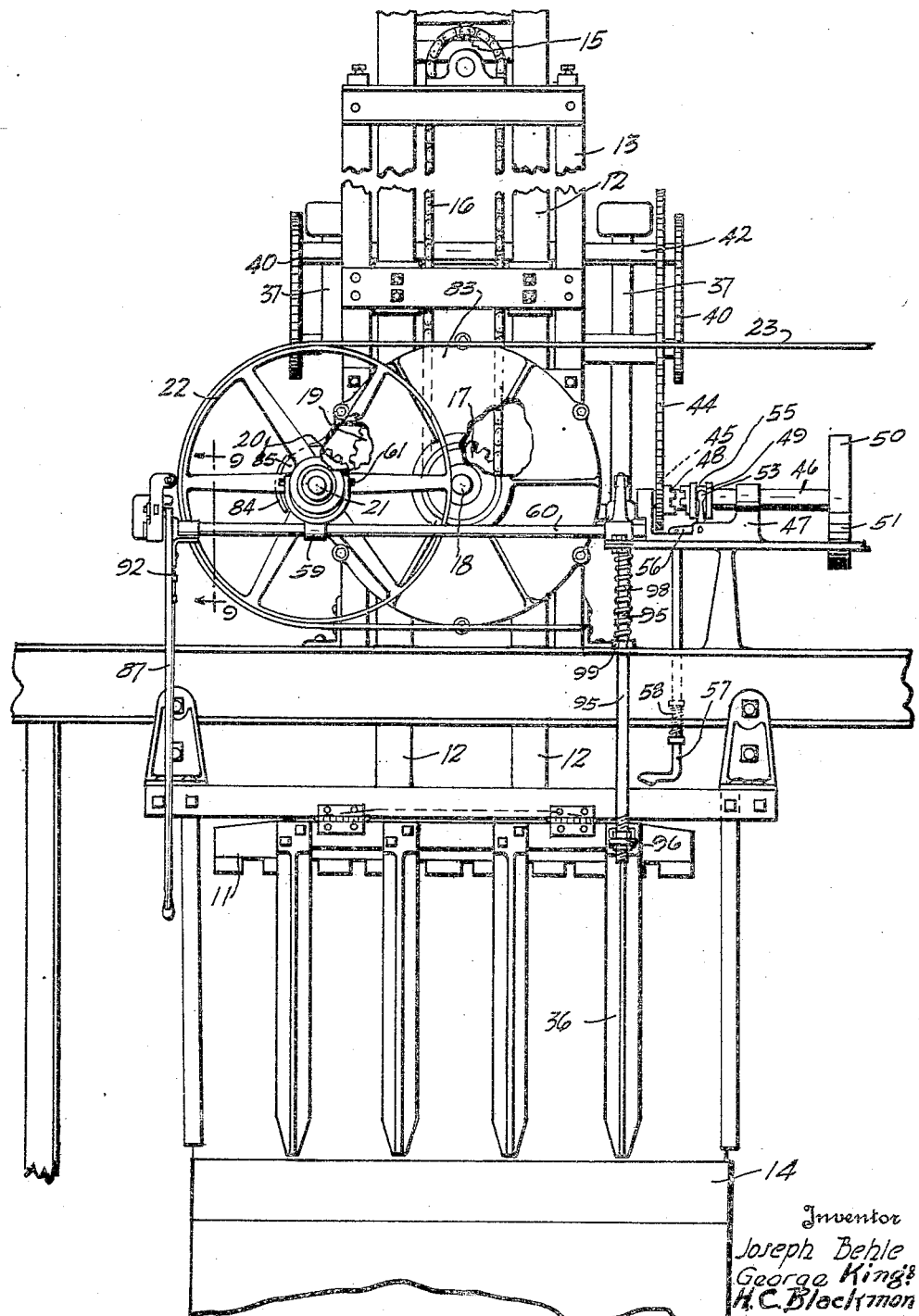

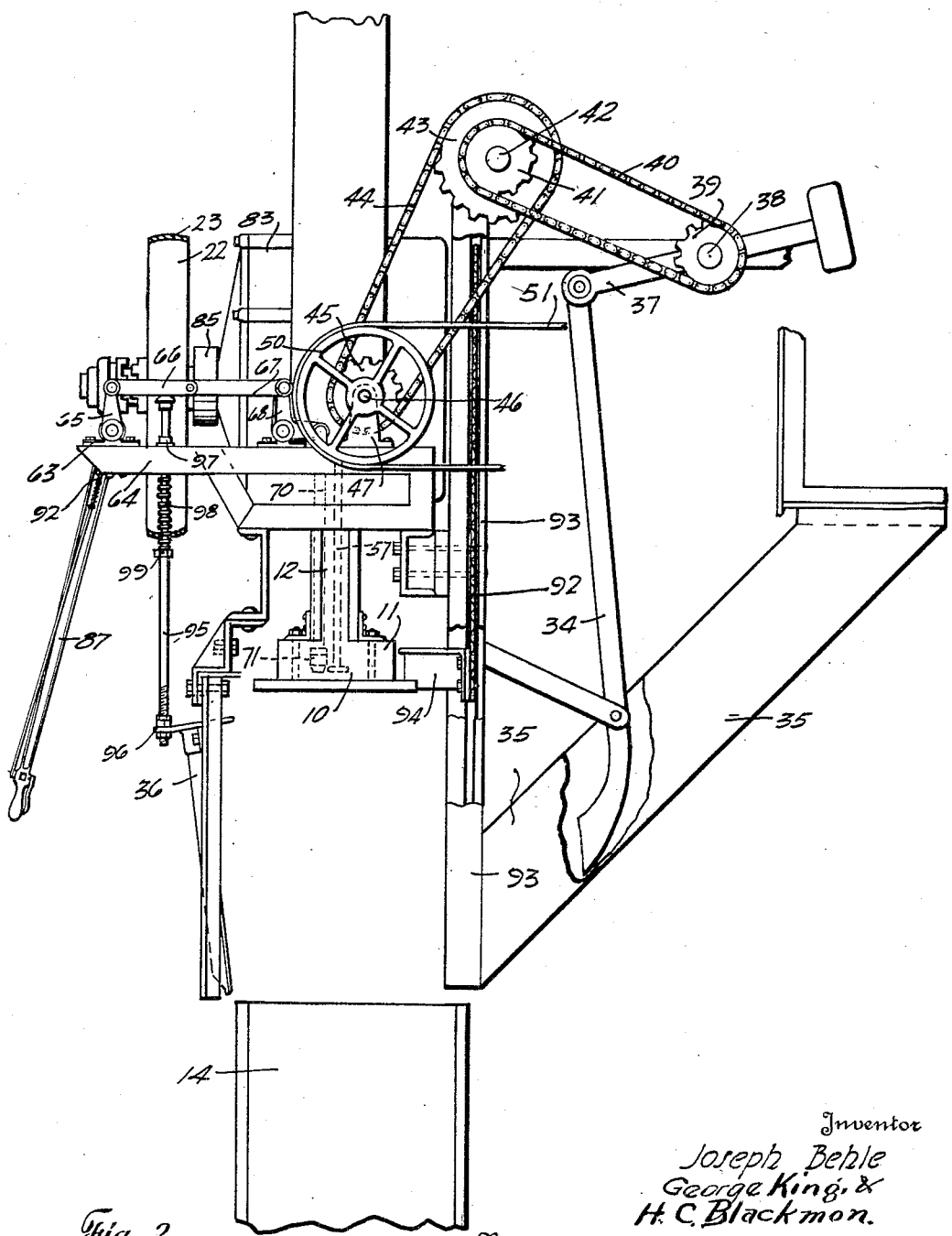

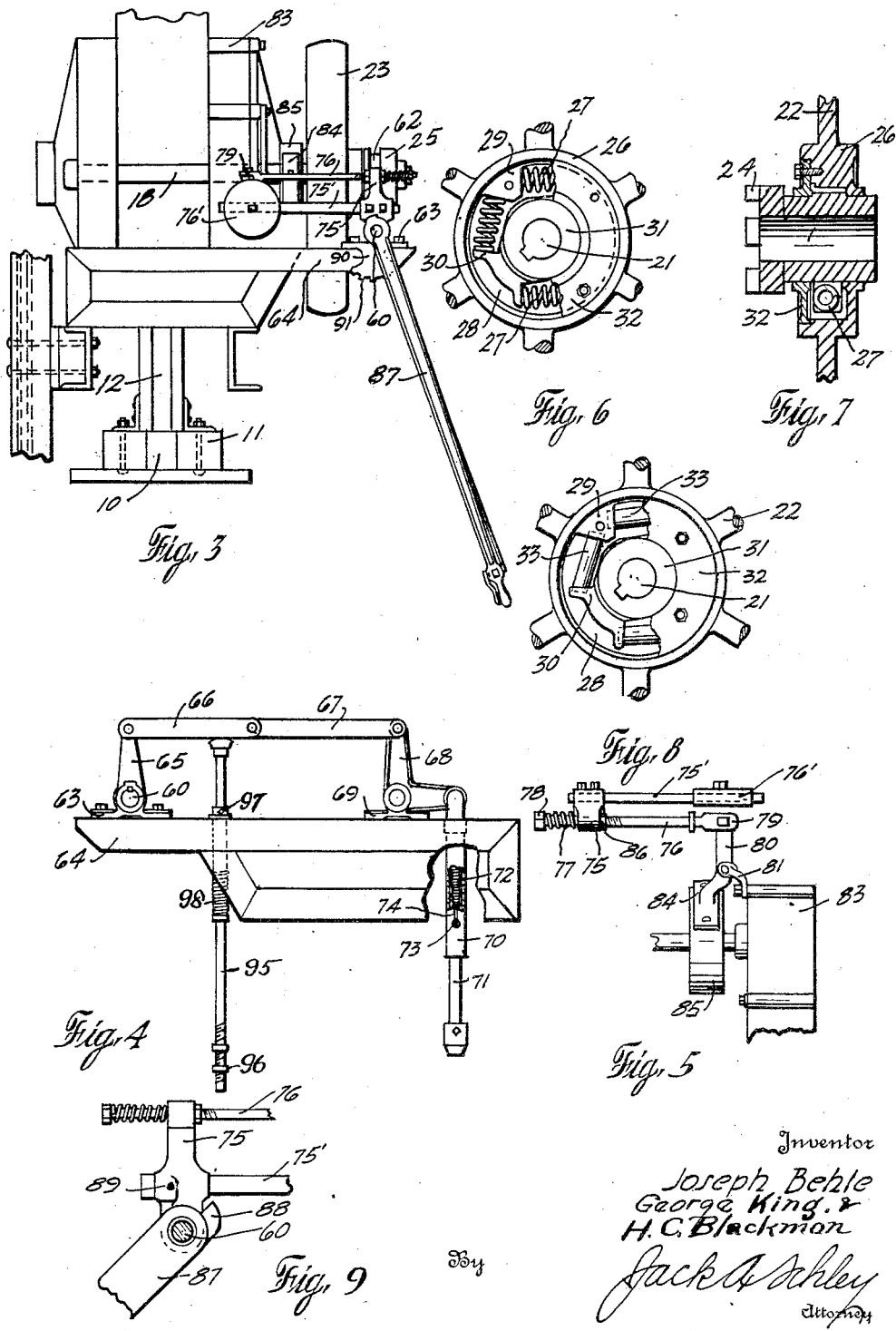

1,826,198

UNITED STATES PATENT OFFICE

JOSEPH BEHLE, GEORGE E. KING AND HENRY C. BLACKMON, OF DALLAS, TEXAS, AS-
SIGNORS TO THE MURRAY COMPANY, OF DALLAS, TEXAS, A CORPORATION OF TEXAS

AUTOMATIC TRAMPER CONTROL MECHANISM

Application filed May 29, 1930. Serial No. 457,370.

This invention relates to new and useful improvements in automatic tramper control mechanism.

One object of the invention is to provide improved means for automatically starting and stopping the mechanism.

A further object of the invention is to automatically control the operation by the accumulation of the material whereby the mechanism is intermittently operated as well as economically operated in proportion to the load.

Another object of the invention is to provide safety means whereby the device is positively locked against operation during the swinging of the boxes.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a partial front elevation of a tramper constructed in accordance with the invention, Figure 2 is a side elevation of the same, Figure 3 is a partial elevation of the opposite side of the tramper, Figure 4 is a detail of the trip control mechanism, Figure 5 is a detail of the brake actuating mechanism, Figures 6 and 7 are detail views of the drive pulley, Figure 8 is a detail of a modified form of the drive pulley, and Figure 9 is a detail view on the line 9—9 of Fig. 1.

In the drawings the numeral 10 designates a tramper plunger of usual construction comprising a head 11 and upstanding spaced parallel bars 12 which constitute a stem or shank for the head. This stem is mounted in a suitable guiding frame 13 for protraction into and out of a bale box 14 which is arranged below the base of the tramper.

In the illustrated embodiment of the invention the movement of the plunger is effected by roller 15 carried by endless chains 16 which are driven by sprockets 17 mounted on a transverse drive shaft 18. For driving the shaft 18, gears 19 are mounted on opposite ends thereof and mesh with pinions 20 on a counter drive shaft 21.

A loose pulley 22 is mounted on one end of the shaft 21 and is driven by endless belt 23 which in turn is driven in any suitable manner. Clutch teeth 24 are provided on the hub of the pulley 22 and engagement by a clutch 25 secured to a countershaft so that when the clutch is engaged with the teeth 24 the shaft 21 will be revolved.

For relieving a strain on the chains 16 caused by abrupt starting, the pulley 22 is provided with a resilient hub 26. The hub comprises a plurality of spiral springs 27, each of which are confined within an annular groove 28 of the hub between bosses 29 protruding from the hub and lugs 30 secured to a collar 31 mounted on the shaft 21.

The springs 27 are held within the groove by a cover 32 secured to the bosses. In this manner the strain of abrupt starting will be absorbed by the springs.

In Figure 8 we show an alternate form of pulley mounting with rubber blocks 33 used in place of the springs. For shifting the clutch 25 to engage the teeth 24, the yoke 59 (as best shown in Fig. 1), is secured on a rock shaft 60 and has pins 61 at its outer ends engaging in an annular groove 62 of the clutch. The shaft is operated at its opposite ends in bearing brackets 63 secured on cross bars 64 of the tramper structure.

As best shown in Figs. 2 and 4, an arm 65 is secured on one end of the shaft 60 and has a pivotal connection to a link 66 which in turn is pivotally connected to a link 67 pivoted to one end of the bell crank lever 68 and forms a normally rigid connection. The lever 68 is mounted in a bracket 69 secured to the cross beam 64 and has pivotally connected to its other end and depending therefrom, an actuating rod 70. This rod is hollow and has telescoped therein a plunger 71. A spring 72 is confined under tension within the rod 70 by the plunger 71 whereby the plunger is held outwardly under tension of the spring. A pin 73 in the upper end of the plunger rides in a slot 74 in the rod thus limiting the telescoping action of the rod and plunger. The plunger and rod are positioned in the path of the tramper head and arranged for engagement by said head when the tramper is in its upper position. Thus as the plunger is engaged by the head and pushed upward, its thrust is yieldingly transmitted to the bell crank lever 68 through the tension of the spring 72 thereby providing for any differences in the setting up of the control mechanism and insuring against breakage of parts.

When the plunger is raised, the lever 68 is actuated and through connection of the normally rigid links 66 and 67 and the arm 65 the shaft 60 is rocked, thereby disengaging the clutch 25 from the pulley 22. To stop any motion of the tramper caused by its inertia after the disengagement of the clutch 25 from the pulley 22, we provide an automatic actuated brake. As best shown in Fig. 5 this brake consists of an arm 75 mounted on one end of the shaft 60. One end of a rod 76 extends through the outer end of the arm and has a spring 77 confined thereon between the arm and a nut 78 secured on the outer end of said rod. The opposite end of the rod has a yoke 79 in which is pivoted one end of a bell crank lever 80. This lever is pivoted at its center to a bracket 81 secured to the gear housing 83.

A brake shoe 84 is mounted on the opposite end of the lever 80 for engaging a wheel 85 securely mounted on the shaft 21 to stop the rotation of said shaft. The arrangement of this brake mechanism is sufficient that when the shaft 60 is rocked to disengage the clutch 25 from the pulley 22 the brake shoe is engaged with the wheel 85 under tension of spring 77. When the shaft 60 is rocked to engage the clutch 25 to the pulley 22, the tension is relieved on the spring 77 and the arm 75 engages a nut 86 on the rod 76 thereby shifting said rod and disengaging the brake shoe from the wheel.

For normally holding the clutch 25 in engagement with the pulley 22 and the brake shoe from engagement with the wheel 85, a lever 75' has one end secured to the arm 75 and has adjustably mounted on its opposite end a weight 76'.

As a safety feature for instantly stopping the motion of the tramper when desired, we provide a manual actuating lever 87 mounted on one end of the shaft 60. As best shown in Fig. 9, a dog 88 on the upper end of the lever 87 is positioned to engage a boss 89 of the arm 75 and arranged so that when the lever is swung in a clockwise direction (Fig. 3), the shaft 60 will be rocked, thereby disengaging the clutch 25 from the pulley 22 and engaging the brake shoe with the wheel 85 as herein before explained.

For locking the lever 87 in the desired position a segment 90 having notches 91 is secured on one of the beams 64 opposite the lever whereby a spring tensioned dog 92 on the lever may be engaged in the notches. When the tramper is in use the lever 87 is positioned so that the dog 88 will not be in the path of the boss 89, thereby allowing the free rocking movement of the shaft 60.

For intermittently feeding cotton into the bale box 14, a rake or pusher type feeder 34 is arranged at one side of the tramper (best shown in Fig. 2) and adapted, when in operation, to push cotton down a chute 35 and into the bale box. Opposed to the exit of the chute 35 the usual hinged pressure gate 36 is mounted and arranged so that the cotton as it accumulates in the bale box will bear against the gate and thus cause the gate to move under pressure of the cotton and the urge of the rake 34 when a sufficient charge has accumulated. At this stage it is desired to have the plunger moved downward into the box to compress the charge of cotton and it is also desirable to have automatic means for stopping the feed of cotton when the plunger starts its downward travel and for starting the feed of cotton again when the plunger returns to its upper position.

The rake feeder illustrated is operated by crank arms 37 mounted on opposite ends of a shaft 38 which revolves in an anti-clockwise direction (Fig. 2). Gears 39 are mounted on opposite ends of the shaft 38 and are driven by chains 40 which in turn are driven by gears 41 mounted on opposite ends of a counter shaft 42.

A gear 43 is mounted on one end of the shaft 42 adjacent one of the gears 41 and is driven by a chain 44 which in turn is driven by a sprocket 45 loosely mounted on a drive shaft 46 which is supported in a bearing bracket 47. As best shown in Fig. 1 clutch teeth 48 are provided in the hub of the sprocket 45 for engagement by a clutch 49 mounted on the shaft 46.

A pulley 50 mounted on the shaft 46 is driven by a belt 51 which in turn may be driven in any suitable manner. For engaging and disengaging the clutch 49 with the teeth 48 to start or stop the operation of the feed rake, a yoke 53 on one end of the bell crank lever 56 engages in an annular groove 55 of the clutch for shifting the same. The lever 56 is pivoted in the bracket 47 and is actuated by a rod 57 depending into the path of the plunger head 11 so that when the head is in its raised position the rod is lifted thus disengaging the clutch from the sprocket and stopping the operation of the rake.

When the rod 57 is raised a spiral spring 58 encircling said rod will be compressed so that when the tramper head releases the rod on its downward movement the clutch 49 will be engaged with the sprocket under tension of the spring 58 thus starting the operation of the rake.

By provision of the lever 87 and its control of the tramper, said tramper may be conveniently lowered and stopped in a position slightly above the bale box 14 when a sufficient charge of cotton has been accumulated in the box for baling. The lowering of the tramper to the position slightly above the box will release the rod 57 and disengage the actuating rake mechanism through tension of spring 58, as best shown in Fig. 1. Also this position of the tramper will lower a gate 92 slidable in a trapway 93, and held in a raised position by angle arms 94 secured to the bottom of the gate and engaging over the head 11 of the tramper, thus closing the chute 35. The bale box 14 is then moved from position beneath the tramper to the cotton press (not shown). When another bale box is then positioned beneath the tramper said tramper is raised, thereby raising the gate and starting the actuation of the rake through engagement with the rod 57.

When a sufficient charge of cotton has accumulated in the bale box with enough pressure urged by the rake 34 to swing the pressure gate 36, a plunger 95 having its lower end adjustably secured to an arm 96 extending from the gate will be raised upward through a bearing backet 97 secured to the beam 64 and engage the link 66, thus raising said link and breaking the rigid connection between the lever 68 and the arm 65 whereby the force of the weight will rock the shaft 60 and engage the clutch 25 with the pulley 22. The engagement of said clutch and pulley will start the reciprocation of the tramper which as it lowers will disengage the plunger 71 and permit the lever 68 under the weight of said plunger 71 to swing in an arc, thereby lowering the pivotal connection between the links 66 and 67 until said links resume their rigid connection.

When the tramper compresses the charge of cotton within the bale box the pressure on the gate 36 is relieved, thereby permitting the gate to resume its normal position under tension of a spring 98 encircling the rod 95 and confined thereon between the bracket 97 and a nut 99.

In the sequence of operation of the parts just described, with the plunger in the elevated position shown in Fig. 2, the driving clutch for the plunger is disconnected, but the clutch for driving the feeder rake being under pressure by the plunger is in driving relation. Cotton is thus fed beneath the plunger until its bulk swings outward the movable pressure gate which carries means to automatically engage the plunger clutch to apply power for descent into the bale box. Such movement automatically removes pressure from the feeder clutch and permits its spring to disconnect the power therefrom.

When pressure is relieved from the gate the connected parts restore the jointed links in the connection between the levers to a straight line to form a rigid connection for disengaging the plunger clutch as the plunger completes its upward travel, at which time power is again applied to the feeder. This operation is continuous and automatic, but it is important to provide a manual control for instantly stopping the parts. This is accomplished by a hand lever independent in its action from the automatic control and which is normally held out of operative relation therewith, as shown in Fig. 9. The invention provides a more efficient and accurate automatic tramper control mechanism of the general type disclosed in the patent to C. L. Mourfield No. 1,728,503 Sept. 17, 1929.

While the specific details of construction of the several parts have been shown and described, changes and alteration may be made therein without departing from the spirit of the invention as recited in the following claims.

What we claim is:

1. In a driven tramper, a driving shaft connected to a tramper plunger, a driven member, a clutch connection between said shaft and member, a depending actuating rod disposed above said plunger, a lever connected to said rod, a pivoted link connecting the lever and movable member of the clutch, a movable gate beneath the plunger, and a connection from the gate for rendering said link inoperative to transmit motion from the lever to the plunger clutch while said gate is under pressure.

2. The combination as defined in claim 1, a pivoted hand lever having a lug disposed to engage a carrier for the movable clutch member, and means for retaining said hand lever in adjusted position.

3. The combination as defined in claim 1, said driven member comprising a belt pulley yieldingly connected with its hub and having the hub provided with a clutch member loosely mounted on said driving shaft.

4. In a driven tramper, a bale box, a plunger therein, a chain drive for said plunger, a driving shaft for said chain, a driven pulley loosely mounted on said shaft and carrying a clutch member, a cooperating clutch member keyed to said shaft, a rock shaft having a yoke engaging the keyed clutch member and also carrying a lever, a crank lever, a depending actuating rod therefrom above the plunger, and pivoted link members connecting said levers in a normal straight line to form a rigid connection.

5. The combination as defined in claim 4, with a tensioned lever disposed upon said rock shaft, a brake drum upon said drive shaft, and a yielding connection from said tensioned lever to a shoe for said drum.

6. The combination as defined by claim 4, with an outwardly swinging gate at said box, and a downwardly tensioned push rod connected to said gate and disposed at its upper end to break joint intermediate said link members.

In testimony whereof we affix our signatures.

JOSEPH BEHLE.
HENRY C. BLACKMON.
GEORGE E. KING.